(12) United States Patent
Fukushima

(10) Patent No.: US 12,292,871 B2
(45) Date of Patent: May 6, 2025

(54) PATTERN UPDATING DEVICE, PATTERN UPDATING METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventor: Shintaro Fukushima, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 17/828,789

(22) Filed: May 31, 2022

(65) Prior Publication Data

US 2022/0405259 A1 Dec. 22, 2022

(30) Foreign Application Priority Data

Jun. 18, 2021 (JP) ................................ 2021-101970

(51) Int. Cl.
*G06F 16/22* (2019.01)
*G06F 16/23* (2019.01)

(52) U.S. Cl.
CPC ...... *G06F 16/2246* (2019.01); *G06F 16/2379* (2019.01)

(58) Field of Classification Search
CPC .......................... G06F 16/2246; G06F 16/2379
See application file for complete search history.

(56) References Cited

U.S. PATENT DOCUMENTS

| | | | | |
|---|---|---|---|---|
| 7,433,879 | B1 * | 10/2008 | Sharma | G06F 16/54 |
| | | | | 707/999.005 |
| 8,972,177 | B2 * | 3/2015 | Zheng | G06T 19/003 |
| | | | | 340/995.27 |
| 11,054,270 | B1 * | 7/2021 | Singh | G08G 1/096888 |
| 2008/0162118 | A1 | 7/2008 | Itoh et al. | |
| 2017/0161337 | A1 * | 6/2017 | Yao | G06F 16/248 |
| 2019/0065587 | A1 * | 2/2019 | Lin | G06F 16/958 |
| 2019/0362016 | A1 * | 11/2019 | Xie | G06F 16/285 |

(Continued)

FOREIGN PATENT DOCUMENTS

| | | |
|---|---|---|
| JP | 2008-151926 A | 7/2008 |
| JP | 2015-191317 A | 11/2015 |
| KR | 10-2016-0122588 A | 10/2016 |

OTHER PUBLICATIONS

Cao et al. "Mining Frequent Spatio-Temporal Sequential Patterns", <https://ieeexplore.ieee.org/stamp/stamp.jsp?tp=&arnumber=1565665&tag=1>, Jan. 3, 2006 (Year: 2006).*

(Continued)

*Primary Examiner* — Matthew J Ellis
(74) *Attorney, Agent, or Firm* — Oliff PLC

(57) ABSTRACT

A pattern updating device that includes a memory, and a processor coupled to the memory. The processor is configured to extract frequently-occurring patterns from a plurality of path information, store the extracted patterns as a predetermined data structure, perform a check of newly acquired path information against the stored predetermined data structure, and based on the check, update the frequently-occurring patterns in all path information, including the newly acquired path information, by updating the stored predetermined data structure.

15 Claims, 8 Drawing Sheets

(56) References Cited

U.S. PATENT DOCUMENTS

2020/0118016 A1* 4/2020 Salomon ................ G06F 16/22

OTHER PUBLICATIONS

Cao et al., "Mining Frequent Spatio-temporal Sequential Patterns," Proceedings of the Fifth IEEE International Conference on Data Mining, 2005.
Giannotti et al., "Efficient Mining of Temporally Annotated Sequences," SIAM International Conference on Data Mining, 2006, pp. 346-357.
Pei et al., "Mining Sequential Patterns Efficiently by Prefix-Projected Pattern Growth," In Proceedings of International Conference on Data Engineering, 2001.
Srikant et al., "Mining Sequential Patterns: Generalizations and Performance Improvements," In Proceedings of the 5th International Conference on Extending Database Technology Advances in Database Technology, University of Wisconsin, Madison, 1996.
Sep. 3, 2024 Office Action issued in Japanese Patent Application No. 2021-101970.
Enami, Shingo et al., "Research on analysis prediction technology of human flow and traffic flow considering microscale and macroscale mobility", Technical report of Electronics, Information and Communication Engineers, Japan, The Institute of Elactronics, Information and Communication Engineers, Feb. 22, 2018, vol. 117, No. 459, pp. 265-268.

* cited by examiner

PATTERN UPDATING DEVICE, PATTERN UPDATING METHOD, AND NON-TRANSITORY COMPUTER-READABLE RECORDING MEDIUM

CROSS-REFERENCE TO RELATED APPLICATION

This application is based on and claims priority under 35 USC 119 from Japanese Patent Application No. 2021-101970 filed on Jun. 18, 2021, the disclosure of which is incorporated by reference herein.

BACKGROUND

Technical Field

The present disclosure relates to a pattern updating device, a pattern updating method, and a non-transitory computer-readable recording medium.

Related Art

H. Cao et al., Mining frequent spatio-temporal sequential patterns, IEEE International Conference on Data Mining (ICDM), 2005 (hereafter Cao et al.), and F. Giannotti et al., Efficient mining of temporally annotated sequences, SIAM International Conference on Data Mining (SDM), 2006 (hereafter Giannotti et al.) disclose methods of using plural trips (road link sequences) as input to extract frequently-occurring patterns by batch processing.

The methods described in Cao et al. and Giannotti et al. provide only technology for using plural trips (road link sequences) as input to extract frequently-occurring patterns by batch processing, and it is necessary to carry out extraction of patterns each time a new trip (road link sequences) is input. Further, although there are many cases in which the extracted patterns can be aggregated by a prefix or the like, with a simple method, as much matching as the number of patterns×the pattern length becomes necessary. In this regard, a pattern refers to a set of specific travel points in a trip, and a pattern length refers to the number of specific travel points in the pattern.

SUMMARY

An aspect of the disclosure is a pattern updating device that includes a memory, and a processor coupled to the memory. The processor is configured to extract frequently-occurring patterns from a plurality of path information, store the extracted patterns as a predetermined data structure, perform a check of newly acquired path information against the stored predetermined data structure, and based on the check, update the frequently-occurring patterns in all path information, including the newly acquired path information, by updating the stored predetermined data structure.

BRIEF DESCRIPTION OF THE DRAWINGS

Exemplary embodiments of the present disclosure will be described in detail based on the following figures, wherein.

DETAILED DESCRIPTION

Figure 1:
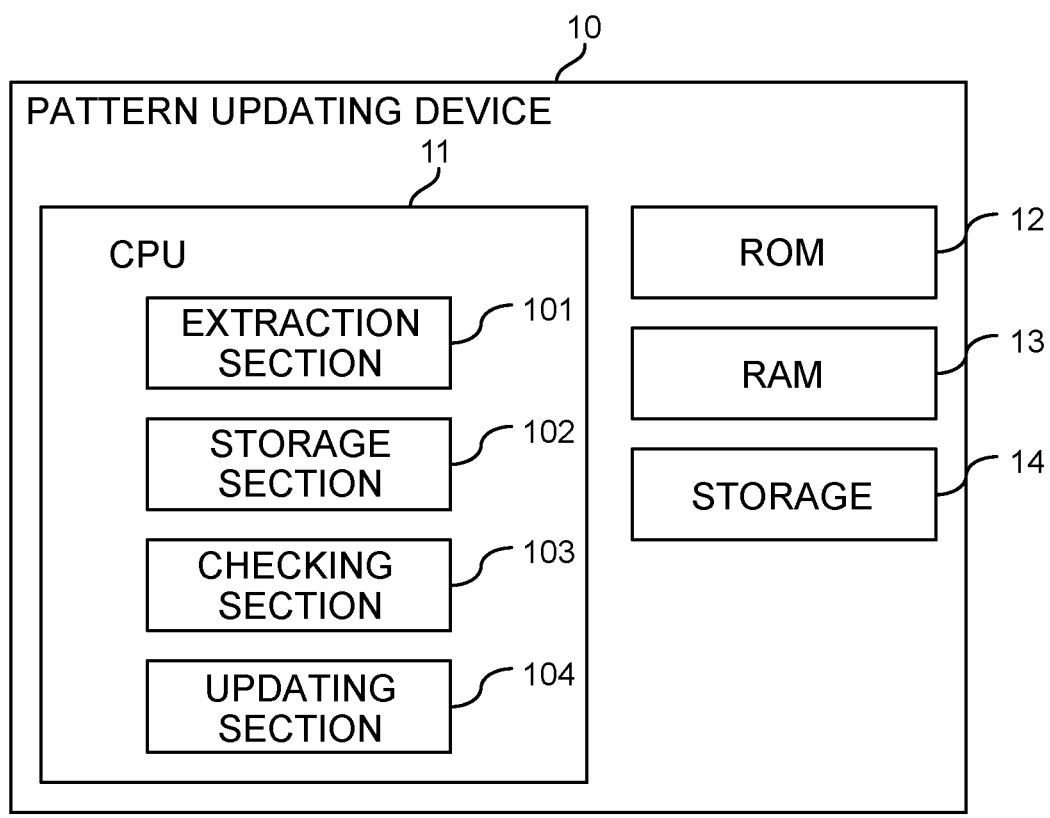
FIG. 1 is a diagram illustrating a configuration of an example of a pattern updating device according to an exemplary embodiment of the technology of the disclosure.

Below, an example of an exemplary embodiment of the present disclosure will be explained with reference to the drawings. It should be noted that the same reference numerals are allocated to the same or equivalent components and portions in the drawings. Further, the relative proportions in the drawings may be exaggerated to aid explanation, and may differ from actual proportions.

FIG. 1 is a diagram illustrating a configuration of a pattern updating device according to the present exemplary embodiment. The pattern updating device 10 illustrated in FIG. 1 is a device that extracts patterns of frequently-occurring trajectories from position information of travel data of a vehicle, efficiently carries out matching with the patterns when new position information has been acquired, and updates the frequently-occurring patterns.

The pattern updating device 10 includes a central processing unit (CPU) 11, which is an example of a hardware processor, a read only memory (ROM) 12, a random access memory (RAM) 13, and a storage 14.

The CPU 11 is a central arithmetic processing unit that executes various programs and controls respective sections. Namely, the CPU 11 reads out a program from the ROM 12 or the storage 14, and executes the program using the RAM 13 as a workspace. The CPU 11 carries out control of the aforementioned respective configurations and various arithmetic processing according to the program recorded in the ROM 12 or the storage 14. In the present exemplary embodiment, a pattern updating program that executes pattern updating processing for updating patterns is stored in the ROM 12 or the storage 14.

The ROM 12 stores various programs and various data. The RAM 13 serves as a workspace to temporarily store a program or data. The storage 14 is configured by a storage device such as a hard disk drive (HDD), a solid state drive (SSD), a flash memory, or the like, and stores various programs including an operating system, as well as various data.

When the aforementioned pattern updating program is executed, the pattern updating device 10 implements various functions using the aforementioned hardware resources. Explanation follows regarding the functional configurations implemented by the pattern updating device 10.

As illustrated in FIG. 1, the pattern updating device 10 functions such that the CPU 11 includes an extraction section 101, a storage section 102, a checking section 103, and an updating section 104 due to the CPU 11 reading out and executing an analysis program stored in the ROM 12 or the storage 14.

The extraction section 101 extracts frequently-occurring patterns from plural path information acquired in advance. The path information may, for example, be stored in the storage 14. For example, the extraction section 101 may extract path information that exceeds a set number of times, which has been set to be less than an occurrence frequency of frequently-occurring patterns that are hoped to be acquired, as the frequently-occurring patterns.

More specifically, the extraction section 101 extracts frequently-occurring patterns from the position information of the plural vehicle travel data. The position information refers to, for example, a series (trip) of GPS latitudes and longitudes. By associating the latitudes and longitudes with, for example, predefined discrete road links, the following representation of a road link sequence is obtained for each trip. In the example of trip 1, this means that the trip has passed from road A to road B, and then to road C. Each road link is also referred to as a node.

Trip1: A→B→C
Trip2: A→B→C→D
Trip3: A→B→D→C→D

The extraction section 101 extracts patterns of frequently-occurring trajectories with respect to such trip representations using, for example, a sequential pattern mining technique proposed in the following documents 1 and 2. At this time, the extraction section 101 extracts only patterns for which a minimum frequency m at which the pattern occurs among a total trip number M and a number N of trips matched with the extracted patterns in the checking section 103, which will be described later, are specified by the user, and a number of occurrences is (m−N) or greater. Further, the user may also specify a ratio r (=(m−N)/M) thereof as a condition.

Document 1
J. Pei et al., PrefixSpan: Mining sequential patterns efficiently by prefix-projected pattern growth. In Proceedings of International Conference on Data Engineering (ICDE), 2001.

Document 2
R. Srikant and R. Agrawal, Mining sequential patterns: generalizations and performance improvements. In Proceedings of the 5th International Conference on Extending Database Technology Advances in Database Technology (EDBT), 1996.

It should be noted that the reason why the number of occurrences of a pattern extracted in advance in order to create a tree structure in the extraction section 101 is (m−N) when checking patterns having the occurrence frequency m in the checking section 103 is to allow room for extraction of the frequently-occurring patterns. For example, in a case in which it is desired to obtain frequently-occurring patterns having an occurrence frequency m=10, when the number N of trips to be newly added is set to N=4, first, the tree structure is created using only trips that have occurred m−N=6 times or more in the extraction section 101. By performing extraction in this manner, the extraction section 101 obtains frequently-occurring patterns having an occurrence frequency of 10 in a case in which all N (=4) trips match as a result of checking of the new trips against patterns having an occurrence frequency of 6.

The storage section 102 stores the patterns extracted by the extraction section 101 as a predetermined data structure. The predetermined data structure may be, for example, one described in the aforementioned documents 1 and 2, or may be a data structure in which common prefixes are aggregated in a tree structure and a number of occurrences at an edge is retained. It should be noted that the functionality of the storage section 102 may be provided at the storage 14.

Figure 2:
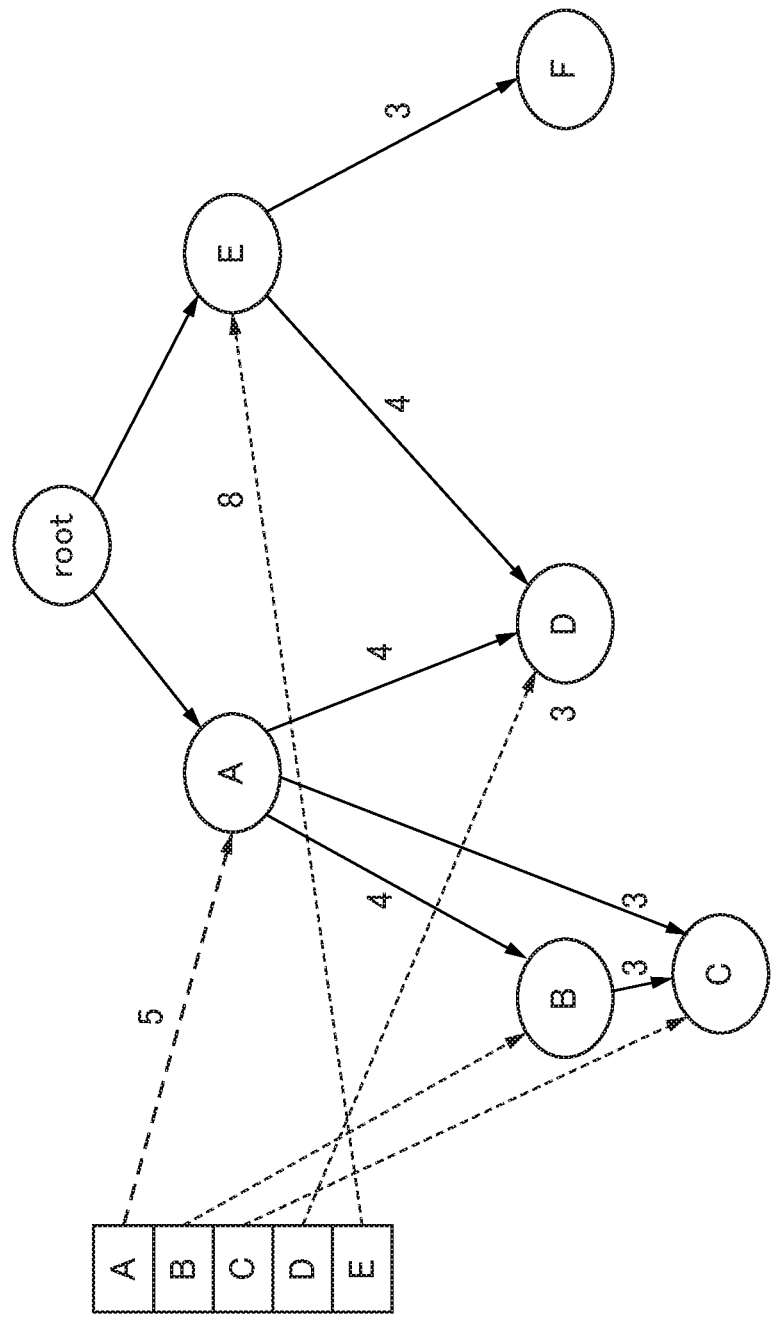
FIG. 2 is a diagram illustrating an example of a data structure of a pattern stored in a storage section.

FIG. 2 is a diagram illustrating an example of a data structure of patterns stored in the storage section 102. FIG. 2 is an example of storage of the following patterns.

Pattern 1: A→B (frequency=4)
Pattern 2: A→B→C (frequency=3)
Pattern 3: A→C (frequency=3)
Pattern 4: A→D (frequency=4)
Pattern 5: E→D (frequency=4)
Pattern 6: E→F (frequency=3)

The checking section 103 checks path information that has been newly acquired by the pattern updating device 10 against the predetermined data structure stored in the storage section 102.

The updating section 104 updates the predetermined data structure stored in the storage section 102 based on the checking of the path information performed by the checking section 103, and thereby updates the frequently-occurring patterns in all of the path information including the path information that has been newly acquired by the pattern updating device 10. The updating section 104 may adapt a pattern that has newly become a frequently-occurring pattern due to the checking by the checking section 103, to the predetermined data structure, and cause the pattern to be stored in the storage section 102.

The checking performed by the checking section 103 and the updating performed by the updating section 104 are repeated until there is no more acquired path information.

Figure 3:
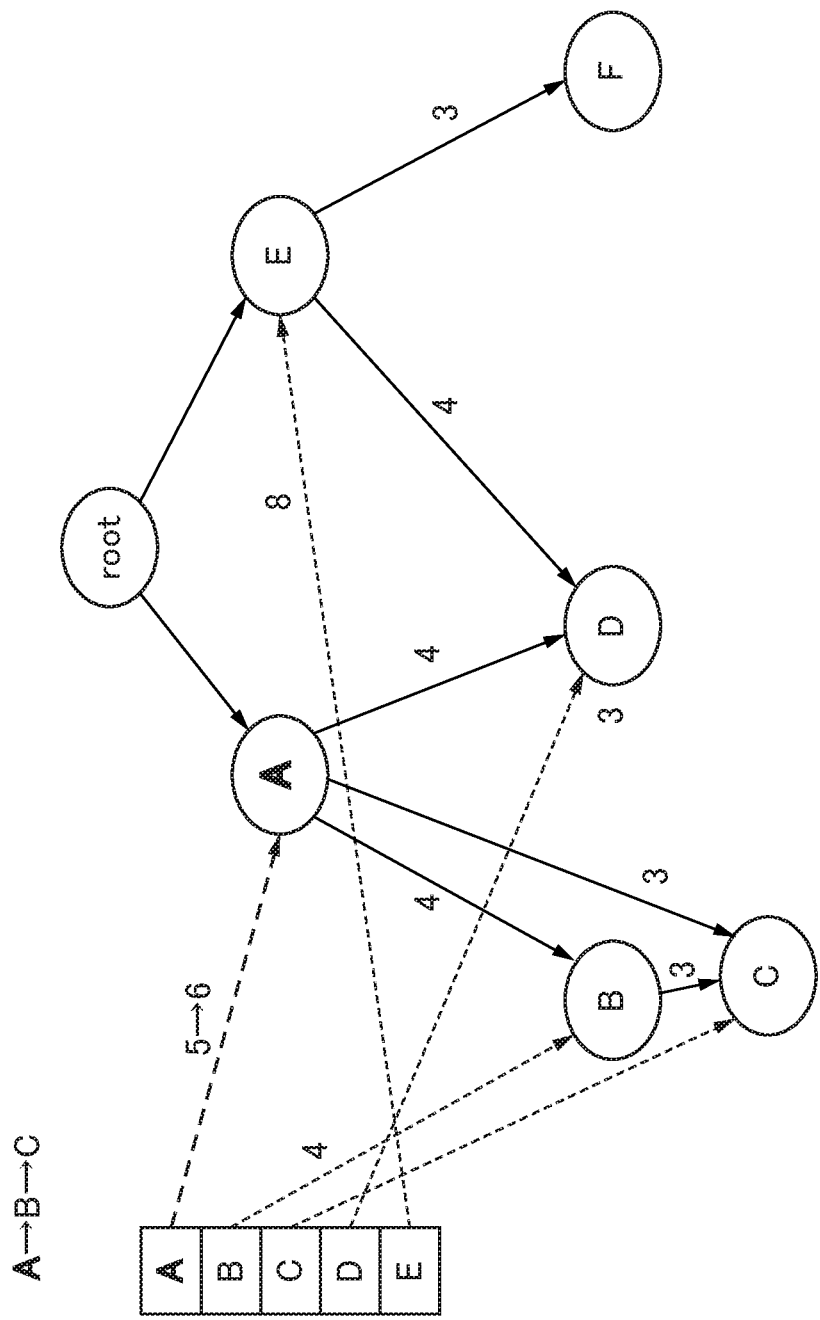
FIG. 3 is a diagram illustrating an example of checking performed by a checking section and updating performed by an updating section.

FIG. 3 to FIG. 7 are diagrams illustrating an example of checking performed by the checking section 103 and updating performed by the updating section 104. FIG. 3 is a checking example in a case in which a trip of A→B→C has been newly acquired.

First, since a starting point is the node A, the checking section 103 first checks the node A. Then, as illustrated in FIG. 3, the updating section 104 increments the number of occurrences of the node A from 5 to 6.

Figure 4:
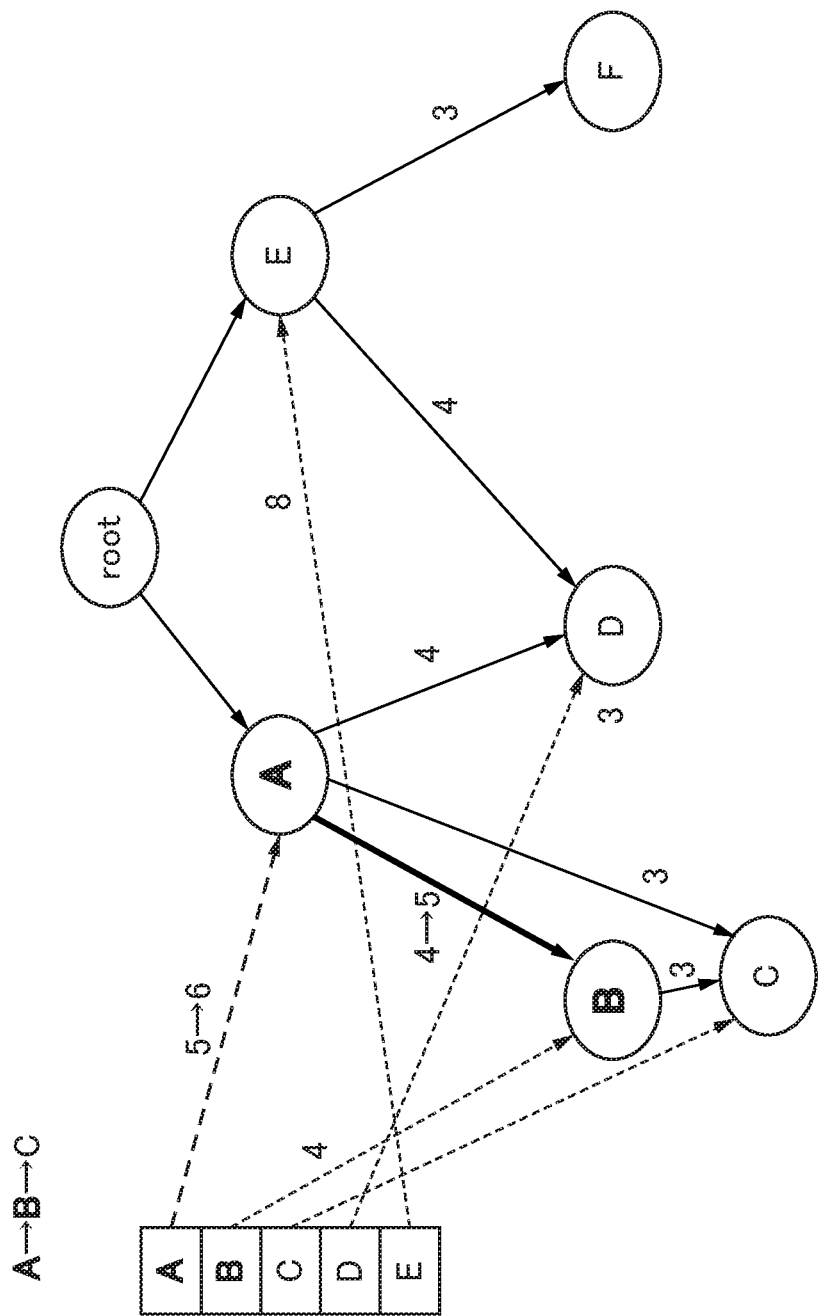
FIG. 4 is a diagram illustrating an example of checking performed by the checking section and updating performed by the updating section.

Since the next node is the node B, the checking section 103 checks a path from the node A to the node B. Then, as illustrated in FIG. 4, the updating section 104 increments the number of occurrences of the path from the node A to the node B from 4 to 5.

Figure 5:
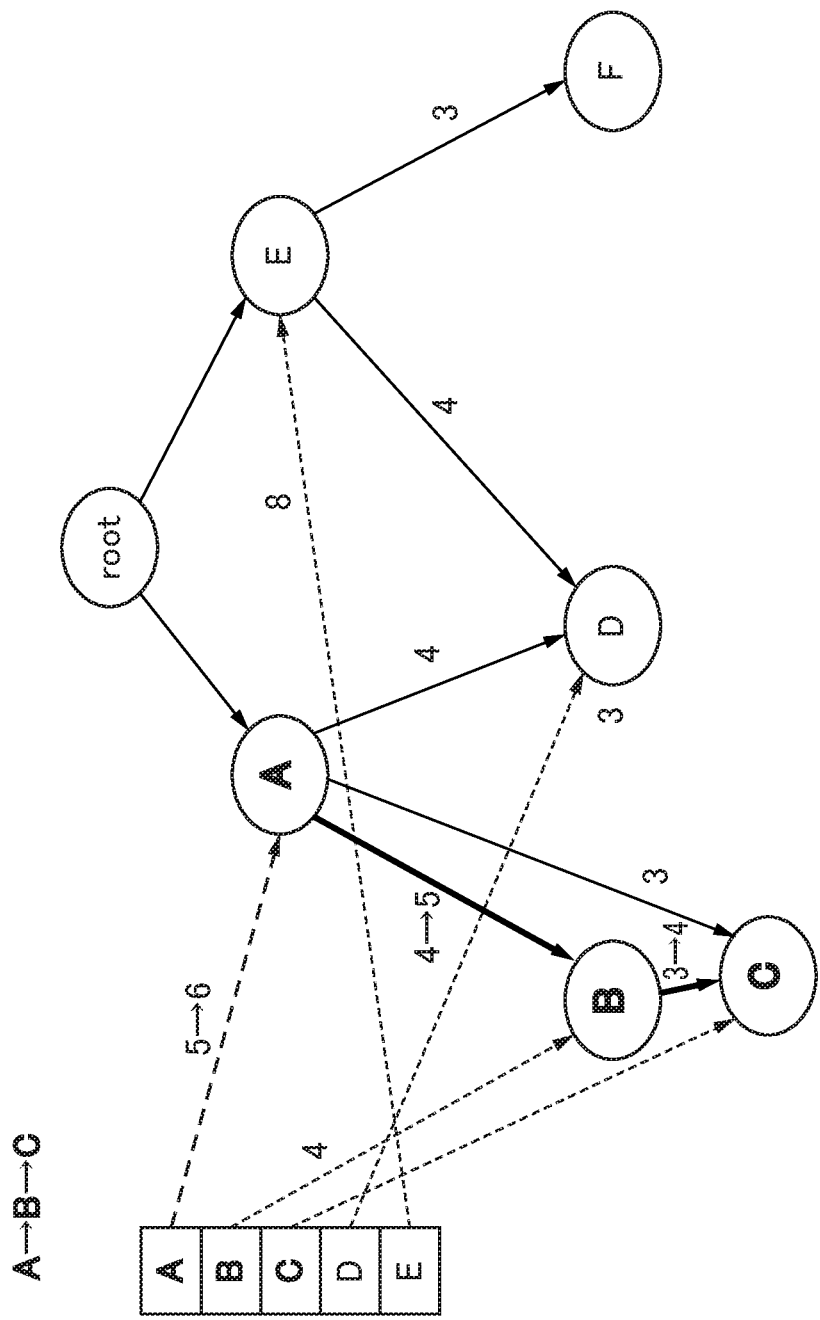
FIG. 5 is a diagram illustrating an example of checking performed by the checking section and updating performed by the updating section.

Since the next node is the node C, the checking section 103 checks a path from the node B to the node C. Then, as illustrated in FIG. 5, the updating section 104 increments the number of occurrences of a path that arrives at the node C from the node A via the node B from 3 to 4.

Figure 6:
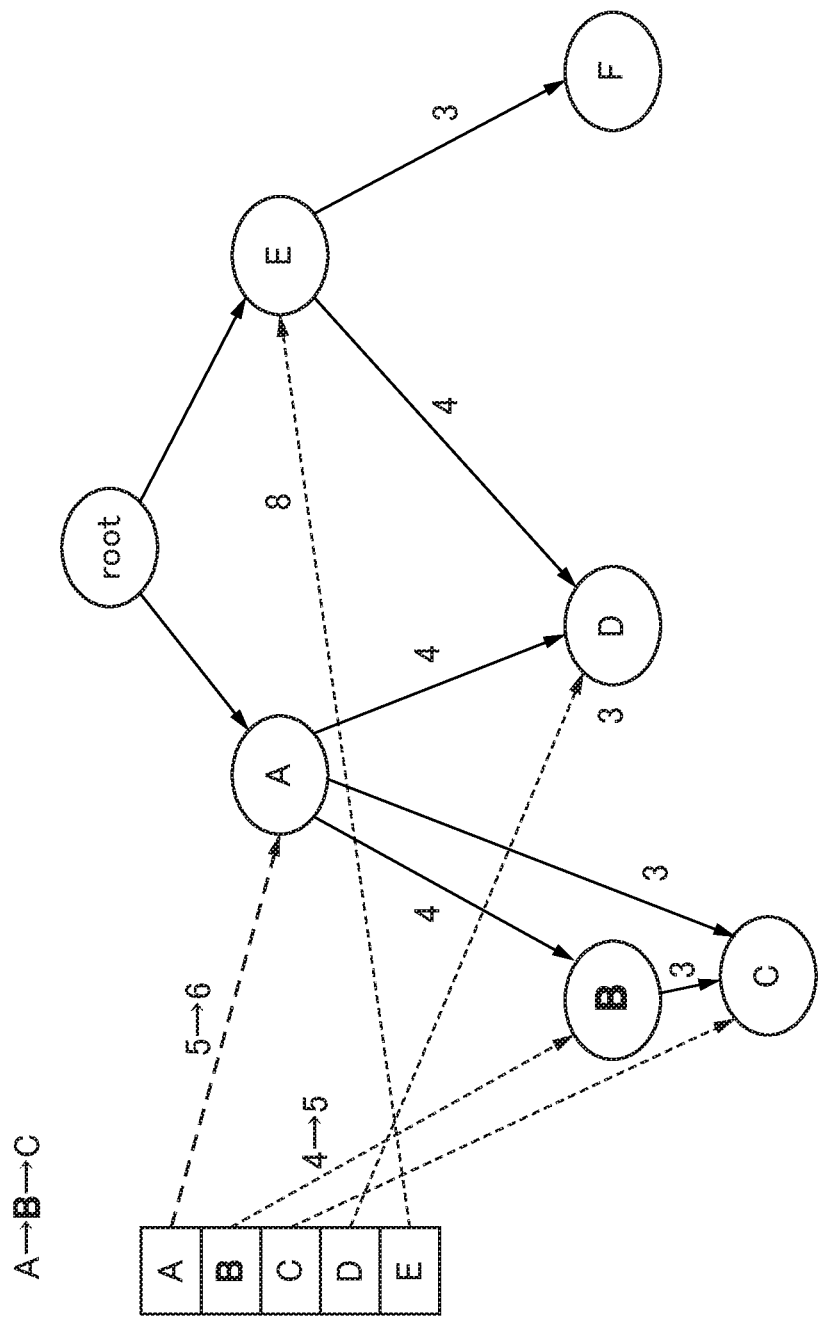
FIG. 6 is a diagram illustrating an example of checking performed by the checking section and updating performed by the updating section.

For the trip of A→B→C, the intermediate node B can also be considered as a starting point. First, since the starting point is the node B, the checking section 103 first checks the node B. Then, as illustrated in FIG. 6, the updating section 104 increments the number of occurrences of the node B from 4 to 5.

Figure 7:
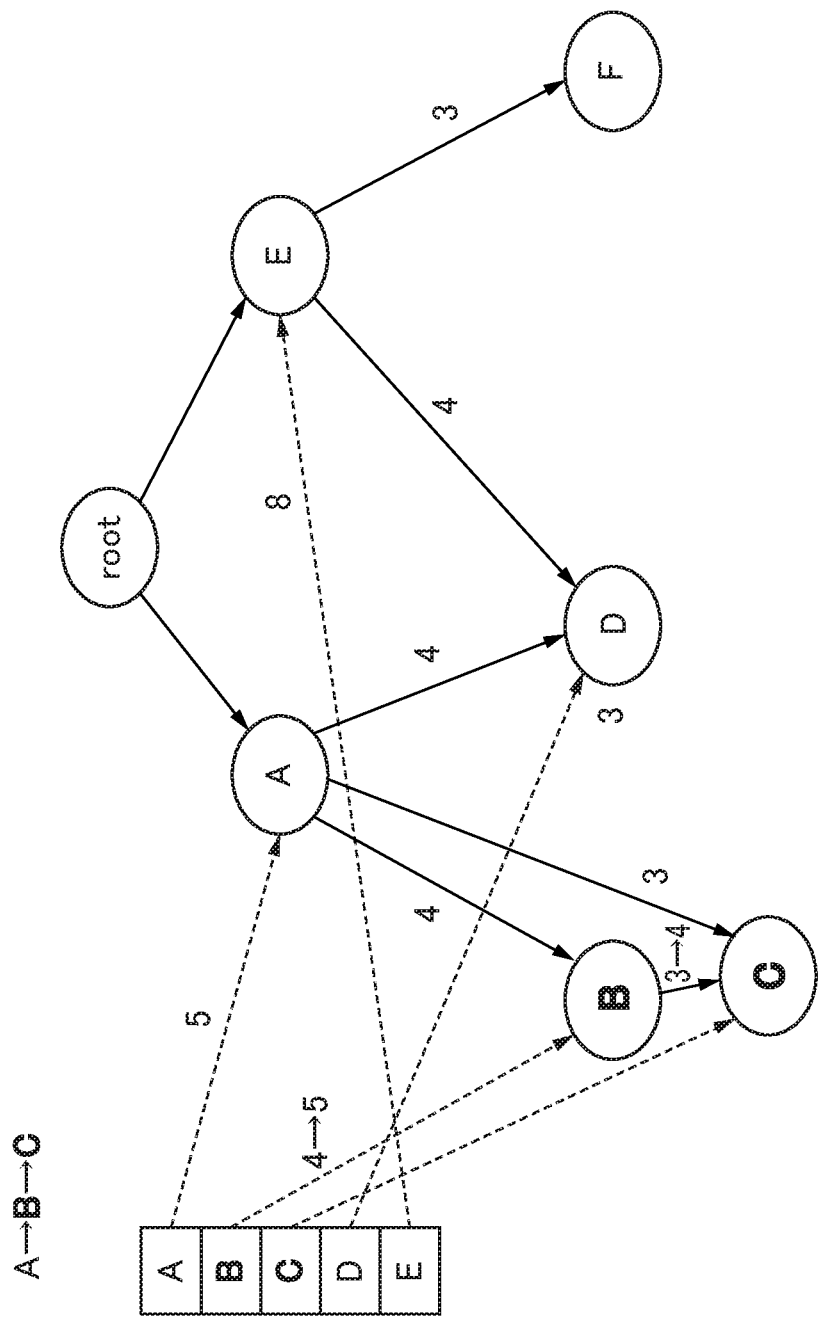
FIG. 7 is a diagram illustrating an example of checking performed by the checking section and updating performed by the updating section.

Since the next node is the node C, the checking section 103 checks the path from the node B to the node C. Then, as illustrated in FIG. 7, the updating section 104 increments the number of occurrences of the path arriving at the node C from 3 to 4.

As illustrated in FIG. 3 to FIG. 7, while incrementing the number of occurrences of a path of the corresponding pattern by one, the updating section 104 newly adds patterns that become equal to or greater than the minimum frequency m or the minimum ratio r that has been specified by the user.

In a case in which a new pattern that does not occur in the patterns has arisen, the checking section 103 stays temporarily at an intermediate node during the checking. For example, in a case in which a trip of A→Z→B has arisen, the trip stays at the node Z, which is a child node from the node A, and the frequency of A→B is updated when the trip has reached the node B further beyond. In this case, if A→Z exceeds the frequency threshold, this is registered as a new pattern.

In a case in which the checking section 103 checks the trip of A→B→C and the updating section 104 updates the frequency, although there are two patterns, namely a case of A→B→C and a case of B→C, in the checking, the frequency of B→C is updated only once. Furthermore, the storage section 102 may also distinguish a pattern of B→C having the node A as a starting point from a pattern of B→C having the node B as a starting point, and retain these as separate information.

In a case in which a pattern such as trip A→B→C→A has newly occurred, the storage section 102 may store the pattern by causing the node A at the end point to newly occur.

Due to having the configuration illustrated in FIG. 1, the pattern updating device 10 extracts patterns of frequently-occurring trajectories from position information (such as that of GPS or the like) of travel data of a vehicle, efficiently carries out matching with the patterns when new position information has been acquired, and updates the frequently-occurring patterns. By efficiently carrying out matching with the patterns and updating the frequently-occurring patterns, the pattern updating device 10 enables a processing load to be reduced.

Next, operation of the pattern updating device 10 will be explained.

Figure 8:
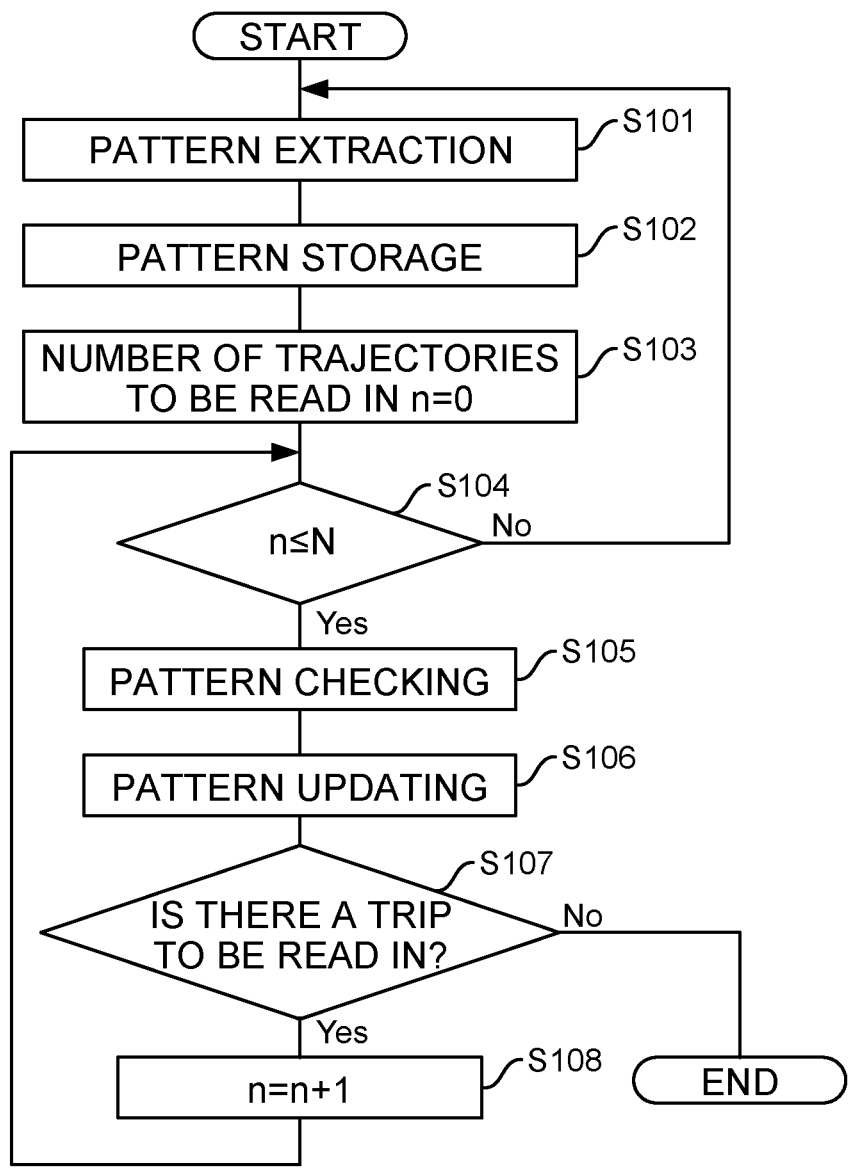
FIG. 8 is a flowchart illustrating a flow of pattern updating processing performed by the pattern updating device.

FIG. 8 is a flowchart illustrating a flow of pattern updating processing performed by the pattern updating device 10. The pattern updating processing is carried out by the CPU 11 reading out a pattern updating program from the ROM 12 or the storage 14, and expanding and executing the pattern updating program in the RAM 13.

The CPU 11 extracts frequently-occurring patterns from the plural path information acquired in advance (step S101). The path information may, for example, be stored in the storage 14. For example, the CPU 11 may extract path information that exceeds a set number of times, which has been set to be less than an occurrence frequency of frequently-occurring patterns that are hoped to be acquired, as the frequently-occurring patterns.

Following step S101, the CPU 11 stores the patterns extracted at step S101 as a predetermined data structure (step S102). The predetermined data structure may be, for example, one described in the aforementioned documents 1 and 2, or may be a data structure in which common prefixes are aggregated in a tree structure and a number of occurrences at an edge is retained.

Following step S102, the CPU 11 starts processing to read in new trajectories. First, the CPU 11 sets the number N of patterns to be newly read in, and sets the variable n to 0 (step S103).

Following step S103, the CPU 11 determines whether or not the variable n is equal to or less than the number N of trips to be matched with the extracted patterns (step S104).

As a result of the determination at step S104, in a case in which n≤N (step S104; Yes), the CPU 11 then checks the patterns from the path information that the pattern updating device 10 has newly acquired, against the predetermined data structure stored at step S102 (step S105).

Following step S105, based on the checking performed at step S105, the CPU 11 updates the predetermined data structure stored at step S102, and thereby updates the frequently-occurring patterns in all of the path information including the path information that has been newly acquired by the pattern updating device 10 (step S106).

Following step S106, the CPU 11 determines whether or not there are still trips to be read in (step S107). In a case in which there is still a trip to be read in (step S107; Yes), the CPU 11 then increments the variable n by one (step S108), and returns to the determination of step S104. In a case in which there is no trip to read in (step S107; No), the CPU 11 ends the series of processing.

On the other hand, as a result of the determination at step S104, in a case in which n>N (step S104; No), the CPU 11 returns to step S101.

By executing the series of processing illustrated in FIG. 8 the pattern updating device 10 extracts patterns of frequently-occurring trajectories from position information (such as that of GPS or the like) of travel data of a vehicle, efficiently carries out matching with the patterns when new position information is acquired, and updates the frequently-occurring patterns. By efficiently carrying out matching with the patterns and updating the frequently-occurring patterns, the pattern updating device 10 enables a processing load to be reduced.

Although the storage 14 is provided at an interior of the pattern updating device 10, the present disclosure is not limited to such an example.

It should be noted that the pattern updating processing carried out by the CPU reading in and executing software (a program) in the aforementioned exemplary embodiments may be executed by various types of processor other than a CPU. Such processors include programmable logic devices (PLD) that allow circuit configuration to be modified post-manufacture, such as a field-programmable gate array (FPGA) or the like, and dedicated electric circuits, which are processors including a circuit configuration custom-designed to execute specific processing, such as an application specific integrated circuit (ASIC) or the like. Further, the pattern updating processing may be executed by any one of these various types of processor, or may be executed by a combination of two or more of the same type or different types of processor (such as, for example, plural FPGAs, a combination of a CPU and an FPGA, or the like). Furthermore, the hardware structure of these various types of processor is, more specifically, an electric circuit combining circuit elements such as semiconductor elements or the like.

Further, although explanation has been given regarding an aspect in which a program for pattern updating processing is stored (installed) in advance in the ROM or the storage in the aforementioned exemplary embodiments, there is no limitation thereto. The program may be provided in a format recorded on a non-transitory recording medium such as a compact disc read only memory (CD-ROM), a digital versatile disc read only memory (DVD-ROM), a universal serial bus (USB) memory or the like. Furthermore, the program may be in a format that is downloaded from an external device via a network.

An object of the present disclosure is to provide a pattern updating device, a pattern updating method, and a non-transitory recording medium that reduce a processing load required for extraction and updating of patterns.

A first aspect of the disclosure is a pattern updating device that includes a memory, and a processor coupled to the memory. The processor is configured to extract frequently-occurring patterns from a plurality of path information, store the extracted patterns as a predetermined data structure, perform a check of newly acquired path information against the stored predetermined data structure, and based on the check, update the frequently-occurring patterns in all path information, including the newly acquired path information, by updating the stored predetermined data structure.

In the pattern updating device of the first aspect, the processor extracts frequently-occurring patterns from a plurality of path information, stores the extracted patterns as a predetermined data structure, performs a check of newly acquired path information against the stored predetermined data structure, and, based on the check, updates the frequently-occurring patterns in all path information, including the newly acquired path information, by updating the stored predetermined data structure. According to the pattern updating device of the first aspect, by adapting the frequently-occurring patterns to the predetermined data structure, storing the patterns, checking the path information against the stored patterns, and updating the patterns based on the checking result, a processing load when updating the patterns can be reduced. According to the pattern updating device of the first aspect, by checking new path information based on the data structure, the checking and updating of frequency can be simplified.

A second aspect of the disclosure is the pattern updating device of the first aspect, wherein the processor is configured to extract path information that exceeds a set number of times, which has been set to be less than an occurrence frequency of frequently-occurring patterns that are intended to be acquired, as the frequently-occurring patterns.

According to the pattern updating device of the second aspect, by extracting the frequently-occurring patterns based on a minimum occurrence frequency of the patterns and a number of the path information to be checked, it is possible to allow room for extracting the patterns.

A third aspect of the disclosure is the pattern updating device of the first aspect, wherein the processor is configured to adapt a pattern that has newly become a frequently-occurring pattern due to the check, to the data structure, and store the pattern.

According to the pattern updating device of the third aspect, a pattern that has newly become a frequently-occurring pattern due to the check can be made a checking target.

A fourth aspect of the disclosure is the pattern updating device of the first aspect, wherein the data structure is a data structure in which common prefixes are aggregated in a tree structure and a number of occurrences at an edge is retained.

According to the pattern updating device of the fourth aspect, due to the data structure being a data structure in which common prefixes are aggregated in a tree structure and a number of occurrences at an edge is retained, the data structure can be simplified.

A fifth aspect of the disclosure is a pattern updating method that includes, by a processor, extracting frequently-occurring patterns from a plurality of path information, storing the extracted patterns as a predetermined data structure, performing a check of newly acquired path information against the stored predetermined data structure, and based on the checking, updating the frequently-occurring patterns in all path information, including the newly acquired path information, by updating the stored predetermined data structure.

A sixth aspect of the disclosure is the pattern updating method of the fifth aspect that includes, by the processor, extracting path information that exceeds a set number of times, which has been set to be less than an occurrence frequency of frequently-occurring patterns that are intended to be acquired, as the frequently-occurring patterns.

A seventh aspect of the disclosure is the pattern updating method of the fifth aspect, wherein the processor adapts a pattern that has newly become a frequently-occurring pattern due to the check, to the data structure, and stores the pattern.

An eighth aspect of the disclosure is the pattern updating method of the fifth aspect, wherein the data structure is a data structure in which common prefixes are aggregated in a tree structure and a number of occurrences at an edge is retained.

A ninth aspect of the disclosure is a non-transitory recording medium storing a program that is executable by a computer to perform processing, the processing includes extracting frequently-occurring patterns from a plurality of path information, storing the extracted patterns as a predetermined data structure, performing a check of newly acquired path information against the stored predetermined data structure, and based on the check, updating the frequently-occurring patterns in all path information, including the newly acquired path information, by updating the stored predetermined data structure.

A tenth aspect of the disclosure is a non-transitory recording medium of the ninth aspect, wherein the processing comprises extracting path information that exceeds a set number of times, which has been set to be less than an occurrence frequency of frequently-occurring patterns that are intended to be acquired, as the frequently-occurring patterns.

An eleventh aspect of the disclosure is a non-transitory recording medium of the ninth aspect, wherein the processing comprises adapting a pattern that has newly become a frequently-occurring pattern due to the check, to the data structure, and storing the pattern.

A twelfth aspect of the disclosure is a non-transitory recording medium of the ninth aspect, wherein the data structure is a data structure in which common prefixes are aggregated in a tree structure and a number of occurrences at an edge is retained.

According to the present disclosure, a pattern updating device, a pattern updating method, and a non-transitory computer-readable recording medium in which a processing load is reduced can be provided by extracting frequently-occurring patterns of path information from position information of travel data of a vehicle, efficiently carrying out matching of the patterns when new position information has been acquired, and updating the frequently-occurring patterns.

What is claimed is:
1. A pattern updating device comprising:
a storage;
a memory; and
a processor coupled to the memory,
the processor being configured to:
receive a plurality of path information obtained from position information of travel data of a vehicle,
extract frequently-occurring patterns from the plurality of path information using sequential pattern mining,
store the extracted patterns as a predetermined data structure in the storage,
perform a check of newly received path information obtained from location of travel data of the vehicle against the stored predetermined data structure,
based on the check, update the frequently-occurring patterns in all path information, including the newly received path information, by updating the stored predetermined data structure, and store the updated patterns in the storage, wherein, based on the check, a pattern that newly becomes a frequently-occurring pattern by exceeding a threshold during the check is adapted to fit the predetermined data structure, and the new frequently-occurring pattern is stored in the storage.

2. The pattern updating device according to claim 1, wherein the processor is configured to extract path information that exceeds a set number of times, which has been set to be less than an occurrence frequency of frequently-occurring patterns that are intended to be acquired, as the frequently-occurring patterns.

3. The pattern updating device according to claim 1, wherein the processor is configured to adapt a pattern that has newly become a frequently-occurring pattern due to the check, to the data structure, and store the pattern.

4. The pattern updating device according to claim 1, wherein the data structure is a data structure in which common prefixes are aggregated in a tree structure and a number of occurrences at an edge is retained.

5. A pattern updating method comprising:
by a processor,
receiving a plurality of path information obtained from position information of travel data of a vehicle,
extracting frequently-occurring patterns from the plurality of path information using sequential pattern mining,
storing the extracted patterns as a predetermined data structure in a storage,
performing a check of newly received path information obtained from location of travel data of the vehicle against the stored predetermined data structure,
based on the checking, updating the frequently-occurring patterns in all path information, including the newly received path information, by updating the stored predetermined data structure, and
storing the updated patterns in the storage,
wherein, based on the check, a pattern that newly becomes a frequently-occurring pattern by exceeding a threshold during the check is adapted to fit the predetermined data structure, and the new frequently-occurring pattern is stored in the storage.

6. The pattern updating method according to claim 5, comprising, by the processor, extracting path information that exceeds a set number of times, which has been set to be less than an occurrence frequency of frequently-occurring patterns that are intended to be acquired, as the frequently-occurring patterns.

7. The pattern updating method according to claim 5, wherein the processor adapts a pattern that has newly become a frequently-occurring pattern due to the check, to the data structure, and stores the pattern.

8. The pattern updating method according to claim 5, wherein the data structure is a data structure in which common prefixes are aggregated in a tree structure and a number of occurrences at an edge is retained.

9. A non-transitory recording medium storing a program that is executable by a computer to perform processing, the processing comprising:
receiving a plurality of path information obtained from position information of travel data of a vehicle,
extracting frequently-occurring patterns from the plurality of path information using sequential pattern mining,
storing the extracted patterns as a predetermined data structure in a storage,
performing a check of newly received path information obtained from location of travel data of the vehicle against the stored predetermined data structure,
based on the check, updating the frequently-occurring patterns in all path information, including the newly received path information, by updating the stored predetermined data structure, and
storing the updated patterns in the storage,
wherein, based on the check, a pattern that newly becomes a frequently-occurring pattern by exceeding a threshold during the check is adapted to fit the predetermined data structure, and the new frequently-occurring pattern is stored in the storage.

10. The non-transitory recording medium storing a program according to claim 9, wherein the processing comprises extracting path information that exceeds a set number of times, which has been set to be less than an occurrence frequency of frequently-occurring patterns that are intended to be acquired, as the frequently-occurring patterns.

11. The non-transitory recording medium storing a program according to claim 9, wherein the processing comprises adapting a pattern that has newly become a frequently-occurring pattern due to the check, to the data structure, and storing the pattern.

12. The non-transitory recording medium storing a program according to claim 9, wherein the data structure is a data structure in which common prefixes are aggregated in a tree structure and a number of occurrences at an edge is retained.

13. The pattern updating device according to claim 1, wherein:
the processor is configured to store the frequently-occurring patterns in a tree structure that aggregates common pattern prefixes, and
performing the check includes checking whether each sequence of the newly received path information matches a branch in the tree structure.

14. The pattern updating device according to claim 1, wherein
the path information comprises a sequence of travel points and the frequently-occurring patterns are represented as sequences of nodes corresponding to the travel points, and
the processor is configured to distinguish and separately store patterns having different starting nodes but the same subsequent nodes in the sequence.

15. The pattern updating device according to claim 4, wherein
the tree structure of the predetermined data structure comprises:
a plurality of nodes including:
a root node representing a start of all the frequently-occurring patterns,
intermediate nodes representing travel points from the path information, and
leaf nodes representing end points of the frequently-occurring patterns, and
edges connecting respective nodes of the plurality of nodes, each edge representing a transition between the respective nodes of the plurality of nodes; and
the number of occurrences at each edge indicates how many times the transition between the respective nodes of the plurality of nodes has occurred.

* * * * *